United States Patent [19]
Takamori

[11] Patent Number: 5,276,579
[45] Date of Patent: Jan. 4, 1994

[54] HIGH ACCURACY TRACK WIDTH THIN-FILM MAGNETIC HEAD

[75] Inventor: Masayuki Takamori, Yokohama, Japan

[73] Assignee: Victor Company of Japan, Ltd., Yokohama, Japan

[21] Appl. No.: 859,011

[22] Filed: Mar. 30, 1992

[30] Foreign Application Priority Data

Mar. 29, 1991 [JP] Japan .................................. 3-121971

[51] Int. Cl.$^5$ ........................... G11B 5/31; G11B 5/23
[52] U.S. Cl. ...................................... 360/126; 360/119
[58] Field of Search .................... 360/126, 122, 119; 29/603

[56] References Cited

U.S. PATENT DOCUMENTS

4,517,616  5/1985  Bischoff ............................. 360/126

Primary Examiner—Robert S. Tupper
Attorney, Agent, or Firm—Jacobson, Price, Holman & Stern

[57] ABSTRACT

A thin-film magnetic head includes a non-magnetic insulating substrate, a lower magnetic substance layer which is stacked on the insulating substrate, a gap layer which is further stacked on a predetermined area of the lower magnetic substance layer, an insulating layer which is stacked on a predetermined area of the gap layer and has a plurality of coil layers, an upper magnetic substance layer which is stacked in the manner of covering entirely the lower magnetic substance layer, the gap layer and the insulating substance layer, and a protective layer which is stacked on the upper magnetic substance layer. The thin-film magnetic head comprises a magnetic substance disposed in first and second grooves, respectively, which are formed in the substrate. The first groove is at a right angle to a portion which is to define a tape contacting surface and has the same width as a track width of a tape. The second groove is at a right angle to the first groove and parallel to the plurality of lines of coil layers.

1 Claim, 6 Drawing Sheets

HIGH ACCURACY TRACK WIDTH THIN-FILM MAGNETIC HEAD

BACKGROUND OF THE INVENTION

The present Invention relates to a thin film magnetic head used in a magnetic recording/playback apparatus and a manufacturing method thereof, and more particularly to a thin-film magnetic head capable of thickly stacking a magnetic layer with retaining a size of an outward appearance of the head in order to prevent a magnetic circuit from a magnetic saturation and a method of manufacturing the thin-film magnetic head.

In general, a thin-film magnetic head has a magnetic layer, an insulating layer and a coil conductive layer which are formed step by step with a stack by means of a vacuum evaporation and etching, and is a smaller and thinner than a conventional bulk head. However, the thin-film magnetic head has the complicated processing steps, and it is impossible for the thin-film magnetic head to precisely keep outline sizes of completed products when the magnetic layer is thickly stacked in order to prevent the magnetic circuit from a magnetic saturation.

Figure 1:
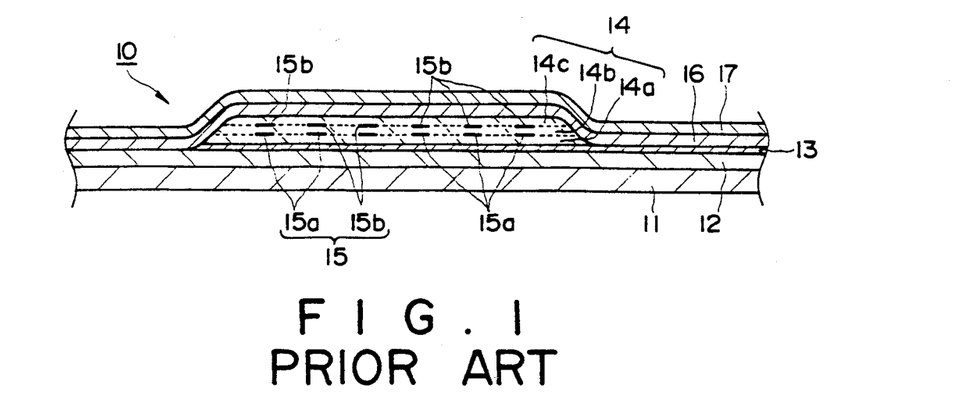
FIG. 1 is a sectional view showing a stacked condition of each layers of a conventional thin-film magnetic head material.

The conventional thin-film magnetic head is shown in FIG. 1. In the figure, a material 10 of a thin-film magnetic head 10A comprises a non-magnetic insulating substrate 11, a lower magnetic substance layer 12 which is stacked on a side of the substrate 11, a gap layer 13 which is stacked on a predetermined and limited area of the magnetic layer 12, a first insulating layer 14a which is stacked on a predetermined and limited area of the gap layer 13, a first coil layer 15a which is formed in line shapes of a plurality of rows on the first insulating layer 14a, a second insulating layer 14b which is stacked on the first insulating layer 14a in the manner of covering the first coil layer 15a, a second coil layer 15b which is formed on the second insulating layer 14b corresponding to the first coil layer 15a, a third insulating layer 14c which is stacked on the second insulating layer 14b in the manner of covering the second coil layer 15b, an upper magnetic substance layer 16 which is stacked in the manner of covering an insulating substance layer 14 including the first through third insulating layers 14a, 14b and 14c and a coil conductive layer 15 including the first and second coil layers 15a and 15b, and a protective layer 17 which is stacked on an upper surface of the upper magnetic substance layer 16.

Figure 2:
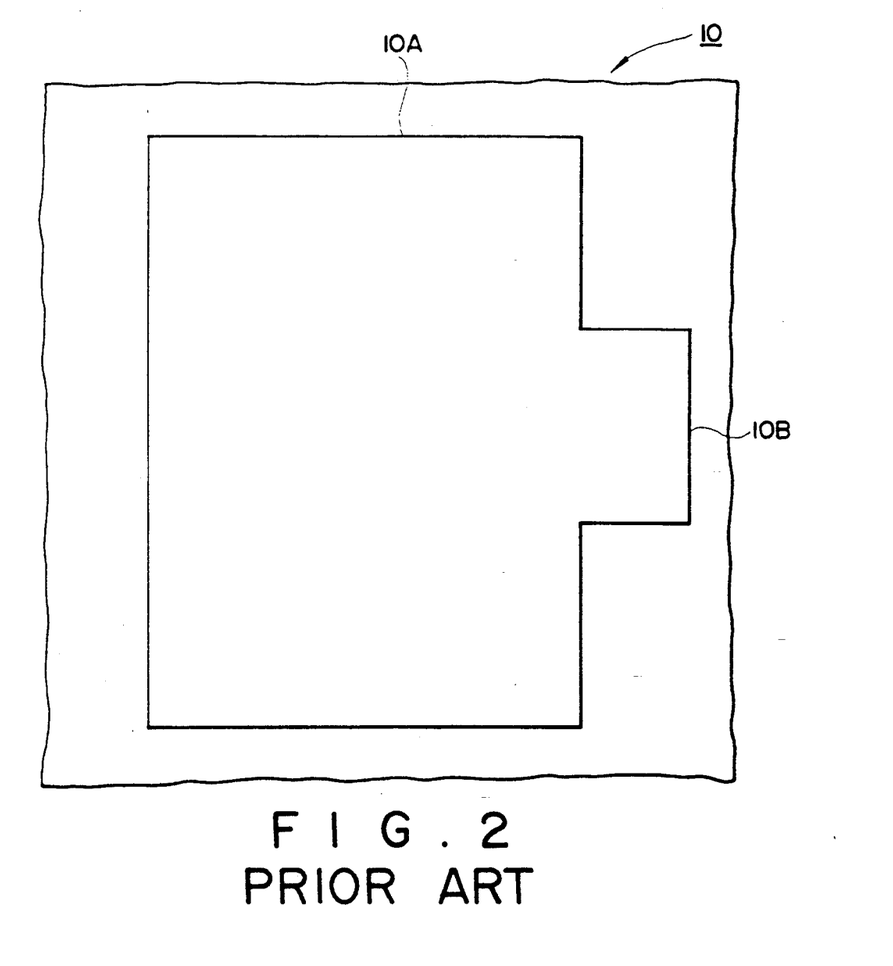
FIG. 2 is a plan view showing the head material shown in FIG. 1 and cutting portions thereof.

As shown in FIG. 2, the material 10 stacked and configured as above, is cut in the outline shape of the thin-film magnetic head 10A so as to complete a product. The head 10A as the product has an outline in the manner of combining a small rectangular portion with a large rectangular portion, and a long side of the small rectangular portion is used as a tape contacting surface 10B.

The material 10 of the conventional thin-film magnetic head 10A is manufactured by some steps shown in FIGS. 3A through 3F. In a first step shown in FIG. 3A, the lower magnetic substance layer 12 which is made of amorphous, is stacked on the non-magnetic insulating substrate 11 which is made of abrasion resisting materials such as glass and ceramics.

Figure 3A:
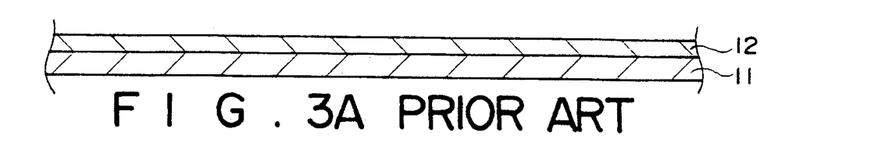
FIGS. 3A through 3F are sectional views respectively showing each steps in a manufacturing method of the conventional head material shown in FIG. 1.
Figure 3B:
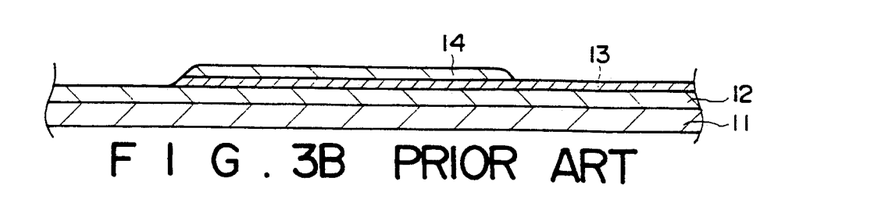

Next, in a second step shown in FIG. 3B, the gap layer 13 which is made of materials of $SiO_2$, $Al_2O_3$ and the like and functions as a head gap of the magnetic head after completed, is stacked in the predetermined or limited area on the magnetic layer 12. Furthermore, the first insulating layer 14a which becomes one portion of the insulating substance layer 14 for insulating the coil conductive layer 15 which will be formed by a step mentioned later, is stacked on predetermined area of the gap layer 13.

Figure 3C:
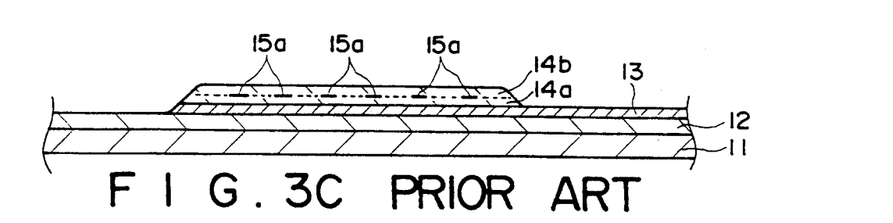

In a third step shown in FIG. 3C, the first coil layer 15a is formed in a predetermined pattern. In this example, the coil layer is arranged in six rows of a line-shape. Next, the second insulating layer 14b is stacked on the first insulating layer 14a in the manner of covering the first coil layer 15a.

Figure 3D:
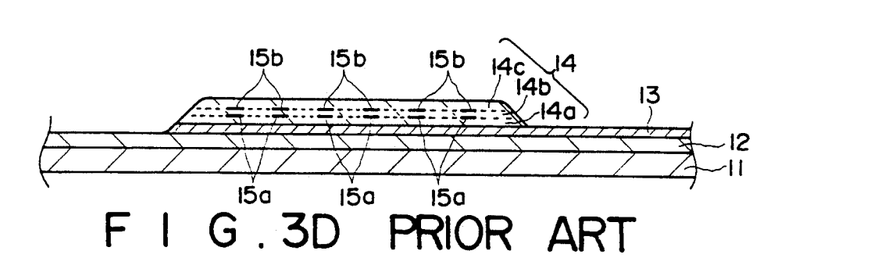

In a fourth step shown in FIG. 3D, the second coil layer 15b is formed in six lines on the second insulating layer 14b corresponding to the first coil layer 15a. Next, the third insulating layer 14c is stacked on the second insulating layer 14b in the manner of covering the second coil layer 15b, so that the insulating substance layer 14 including the first through third insulating layers 14a, 14b and 14c is formed in the manner of completely insulating the coil layer 15 of two stages and six lines.

Figure 3E:
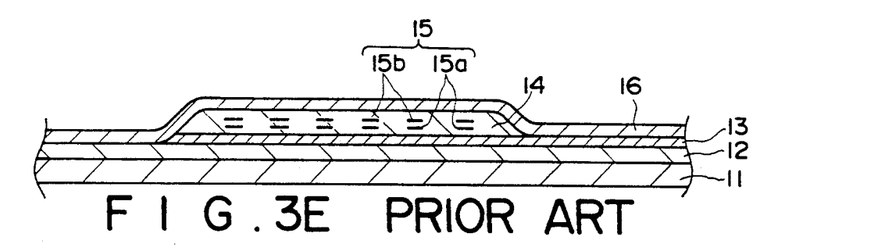

Furthermore, in a fifth step shown in FIG. 3E, the upper magnetic substance layer 16 of amorphous materials is stacked in a predetermined thickness in the manner of further covering an exposed portion of the gap layer 13, the insulating substance layer 14 which is formed in the predetermined area of the gap layer 13, and the coil layer 15 which is covered by the insulating substance layer 14.

Figure 3F:
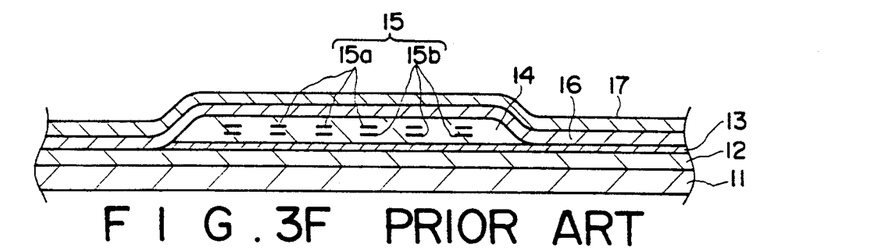

Finally, in a sixth step shown in FIG. 3F, the protective layer 17 of plastic or low-temperature melting-point glass materials, is stacked in the manner of covering the upper surface of the upper magnetic substance layer 16, thereby completing the material 10 of the thin-film magnetic head 10A.

The material 10 formed by the above steps, is cut in a predetermined shape shown in FIG. 2, thereby completing the thin-film magnetic head 10A as the product.

The material 10 of head 10A has three stages of the insulating layers and two stages of the coil layers which are formed between the insulating layers. In order to form each of the layers, there is used a thin-film formation technique such as sputtering and a vacuum evaporation and a thin-film treatment technique such as ion-milling or dry etching.

It is necessary for the conventional thin-film magnetic head 10A to form the lower magnetic substance layer 12 and the upper magnetic substance layer 16 which constitute a magnetic loop each having several ten micrometers thick in order to prevent the magnetic loop from a magnetic saturation. However, in case where the magnetic layers 12 and 16 have the thickness of this, respectively, because the layers have patterning accuracy of plus and minus 5 to 10 micra when patterning is performed to both layers 12 and 16, an accuracy of the outline size of the head as a product is remarkably reduced.

Accordingly, in the case where a track width of the thin-film magnetic head 10A is formed by patterning the lower and upper magnetic substance layers 12 and 16, the conventional magnetic head has the problem that it is difficult to obtain the high-accuracy of the track width.

SUMMARY OF THE INVENTION

In order to solve the above problem, an object of the present invention is to provide a thin-film magnetic head having a high-accuracy of the outline size by increasing an accuracy of a track width when the thin-film magnetic head is completed, and to provide a method of manufacturing therefor capable of obtaining a high-accuracy for sizes of each layers by forming a lower magnetic substance layer in shallow grooves which are previously formed.

In order to achieve the above object, in a thin-film magnetic head according to the present invention having a non-magnetic insulating substrate, a lower magnetic substance layer which is stacked on the substrate, a gap layer which is further stacked on the lower magnetic substance layer, an insulating substance layer which is stacked on a predetermined area of the gap layer and includes a coil conductive layer having a plurality of lines of coil layers, an upper magnetic substance layer which is stacked in the manner of covering the entire of the lower magnetic substance layer, gap layer and insulating substance layer, and a protective layer which is stacked on the upper magnetic substance layer, the thin-film magnetic head is characterized in that at least the lower magnetic substance layer is formed from a magnetic substance which is filled up in first and second grooves. The first groove is formed in the substrate in the manner of having the same width as a track width of a tape and which is at right angles to a portion that becomes a tape contacting surface when the magnetic head is completed. The second groove is formed in the substrate in the manner of being at right angles to the first groove and along the direction of the plurality of lines of the coil layers.

Furthermore, a method of manufacturing a thin-film magnetic head comprises a step of forming a first groove in the manner of having the same width as a track width of a tape and being at right angles to a portion which becomes a tape contacting surface when a head is completed; a step of forming a second groove in the substrate in the manner of being at right angles to the first groove and being parallel to the direction which is formed coil layers when the thin-film magnetic head is completed; a step of forming a lower magnetic substance layer in the manner of filling up the first and second grooves which are formed in the substrate and of making the magnetic substance layer the same plane to other portions of the substrate; a step of forming a gap layer at a predetermined area on the same plane by the substance and the lower magnetic substance layer; a step of forming an insulating substance layer having a plurality of insulating layer at a predetermined portion and forming a coil layer having a plurality of lines and stages of coil conductive layers at a predetermined portion; a step of stacking an upper magnetic substance layer having a predetermined thickness in the manner of covering the entirety of an exposed portion of the lower magnetic layer, the gap layer and the insulating layer; and a step of stacking a protective layer which covers an upper surface of the upper magnetic substance layer.

DETAILED DESCRIPTION OF THE PREFERRED EMBODIMENTS

There will now be described preferred embodiments of a thin-film magnetic head and a method of manufacturing the thin-film magnetic head material according to the present invention with reference to the accompanying drawings.

Figure 4:
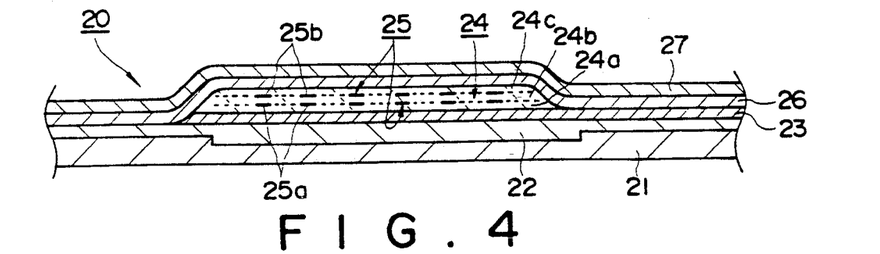
FIG. 4 is a sectional view showing a material of a thin-film magnetic head according to one embodiment of the present invention.

At first, a thin-film magnetic head according to one embodiment of the present invention is described with reference to FIGS. 4 and 5. In FIG. 4, a material 20 of a thin-film magnetic head 20A comprises a non-magnetic insulating substrate 21, a lower magnetic substance layer 22 which is filled up in grooves formed on one side of the substrate 21, a gap layer 23 which is stacked on a predetermined area on the substrate 21 and the magnetic substance layer 22, a first insulating layer 24a which is stacked on a predetermined and limited area of the gap layer 23, a first coil layer 25a which is formed in line shapes of a plurality of rows on the first insulating layer 24a, a second insulating layer 24b which is stacked on the first insulating layer 24a in the manner of covering the first coil layer 25a, a second coil layer 25b which is formed on the second insulating layer 24b corresponding to the first coil layer 25a, a third insulating layer 24c which is stacked on the second insulating layer 24b in the manner of covering the second coil layer 25b, an upper magnetic substance layer 26 which is stacked in the manner of covering an insulating substance layer 24 including the first through third insulating layers 24a, 24b and 24c and a coil conductive layer 25 including the first and second coil layers 25a and 25b, and a protective layer 27 which is stacked on an upper surface of the upper magnetic substance layer 26.

Figure 5:
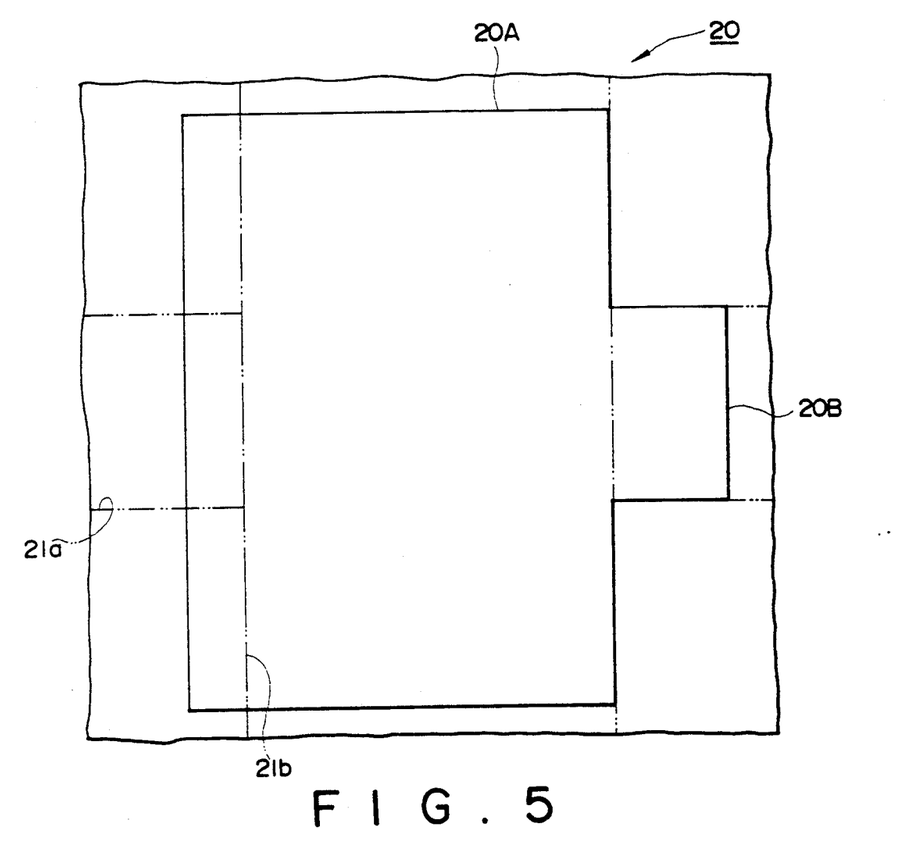
FIG. 5 is a plan view showing a portion where a first and second grooves are formed and a portion where the head material is cut according to the above embodiment.

As shown in FIG. 5, the material 20 having the above-mentioned configuration, is cut in a shape of outline of the thin-film magnetic head 20A, thereby completing a head product. The head 20A to be a product has an outline shape by combining a small rectangular portion with a large rectangular portion, and has a tape contacting surface 20B at a long side of the small rectangular portion.

The thin-film magnetic head 20A has substantially the same configuration as the conventional thin-film magnetic head 10A. The different point between the head materials 10 and 20 resides in that a first groove 21a and a second groove 21b are formed in the substrate 21. The first groove 21a, as shown by the imaginary line in FIG. 5, is shallowly formed in the direction to be at right angles to the surface which becomes the tape contacting surface 20B after completing the head as the product. The second groove 21b is formed in the direction to be at right angles to the first groove 21a and be parallel to the coil conductive layer 25 which is formed in plural number of lines and stages. The formation of the first and second grooves 21a and 21b, uses cutting by dicing-saw and laser and processing by various kinds of etching. The width of the first groove 21a corresponds to the track width of a tape which is used at recording and playback, for example, 19 micra, and the width of the second groove 21b corresponds to the portion where the coil layer 25 will be formed, for example, 300 micra. Both of the first and second grooves 21a and 21b have the depth W, and because the first groove 21a is formed in a circular arc shape, the greatest depth of the first groove 21a is depth W. In such a manner, the formation that the second groove 21b is deeper than the first groove 21a, is desirable for reducing the magnetic reluctance of the head when the head 20A is mounted on a magnetic recording/playback apparatus.

There will now be described a method of manufacturing the material 20 of the thin-film magnetic head 20A according to the present invention.

Figure 6:
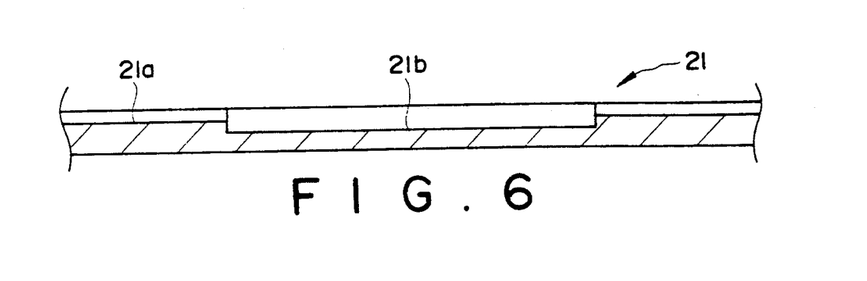
FIG. 6 is a sectional view showing the first and second grooves which are formed in a non-magnetic insulating substrate of the thin-film magnetic head according to the above embodiment of the present invention.
Figure 7:
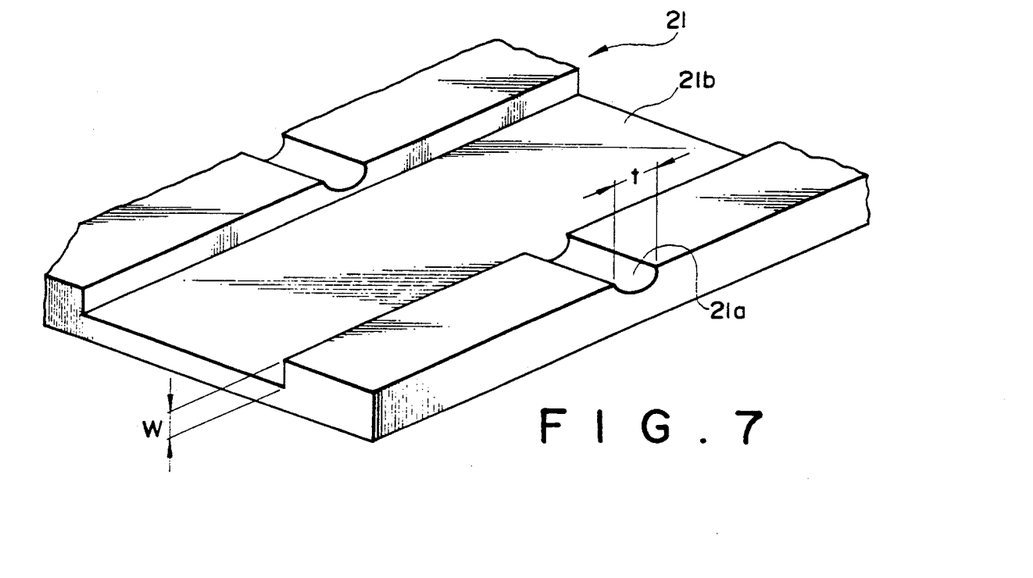
FIG. 7 is a perspective view showing the substrate in which two kinds of grooves shown in FIG. 6 are formed.
Figure 8:
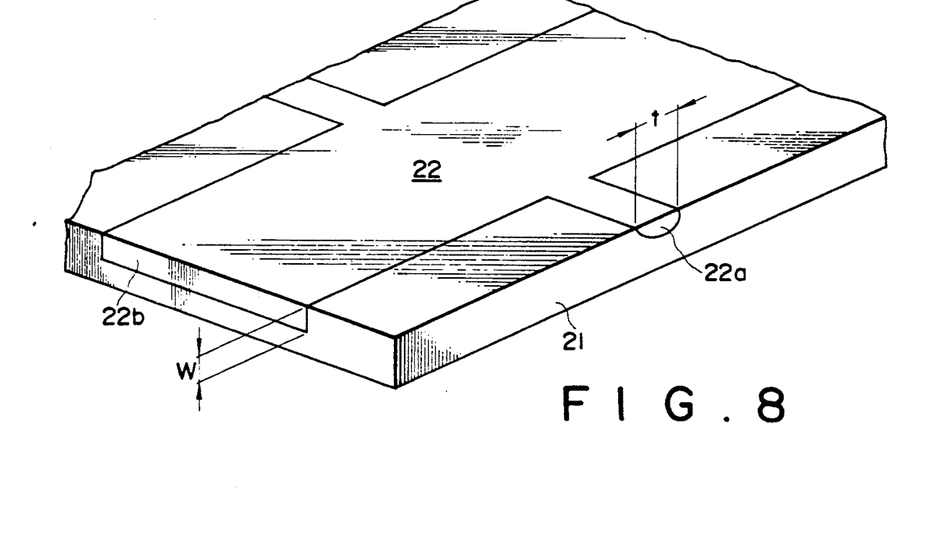
FIG. 8 is a perspective view with a partial cut showing a lower magnetic layer which is formed in the manner of filling up the grooves of the substrate.

The material 20 of the thin-film magnetic head 20A is manufactured through steps shown in FIGS. 6, 7, 8 and 9A through 9F. At first, as shown in FIGS. 6 and 7, the first groove 21a and the second groove 21b having predetermined sizes and shapes are respectively formed at predetermined portions of the substrate 21 as a pre-treatment step. Namely, the first groove 21a has a cross section of a circular arc shape, and the second groove 21b has a cross section of a rectangular shape. Even though the respective depth and width of the first and second grooves 21a and 21b are determined in correspondence with the necessary characteristics of the thin-film magnetic head 20A after completed, the first groove 21a is formed at least in the manner of having the width t corresponding to the track width which is formed in the tape at recording or playback because the cut surface of the first groove 21a is exposed at the tape contacting surface 20B of the head 20 after completed. A relation between the first and second grooves 21a and 21b, is schematically shown in the perspective view of FIG. 7.

Next, a stacked step is shown in FIGS. 8 and 9A through 9F. In a first step shown in FIG. 9A, a lower magnetic substance layer 22 of amorphous, sendust or Permalloy (Trade Name) is filled up in the two-kinds grooves 21a and 21b of the substance 21 which is made of materials having an abrasion resistance such as glasses and ceramics. This condition is plainly shown in the perspective view of FIG. 8. Namely, a first magnetic substance layer portion 22a is filled up in the first groove 21a and a second magnetic substance layer portion 22b is filled in the second groove 21b. Accordingly, the lower magnetic layer 22 comprises the magnetic substances 22a and 22b which correspond to the grooves 21a and 21b, respectively. An upper surface of the substrate 21 becomes flat by lapping treatment after filling the magnetic substance layer portions 22a and 22b.

Figure 9A:
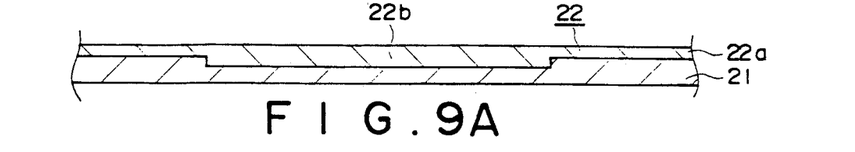
FIGS. 9A through 9F are sectional views showing each steps of a method of manufacturing a thin-film magnetic head material according to the present invention.
Figure 9B:
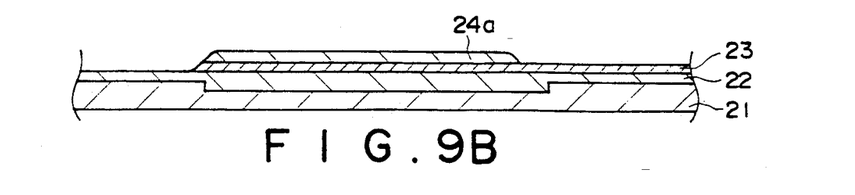

Next, in a second step shown in FIG. 9B, the gap layer 23 is stacked in a predetermined area on a surface which is formed by the substrate 21 and the lower magnetic substance layer 22. The gap layer 23 is made of materials such as $SiO_2$, $Al_2O_3$ and the like, and functions as a head gap of the completed magnetic head. Furthermore, the first insulating layer 24a is stacked on the predetermined area of the gap layer 23. The first insulating layer 24a is a part of the insulating substance layer 24 for insulating a coil layer 25 which will be formed by a step described later.

Figure 9C:
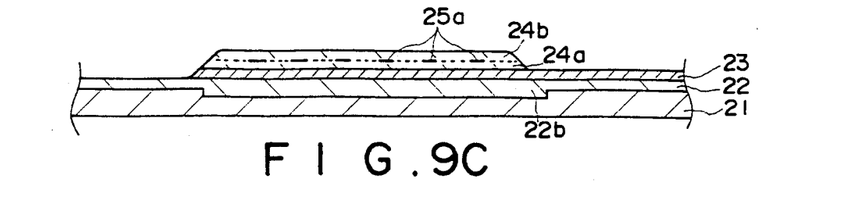

In a third step shown in FIG. 9C, a first coil layer 25a is formed in a predetermined pattern. In this embodiment, the coil conductors of the coil layer 25a are arranged in six lines. Next, a second insulating layer 24b is stacked on the first insulating layer 24a in the manner of covering the first coil layer 25a.

Figure 9D:
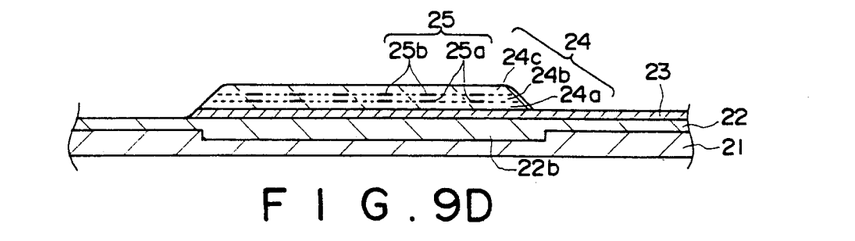

Next, in a fourth step shown in FIG. 9D, the second coil layer 25b is formed on the second insulating layer 24b corresponding to the first coil layer 25a in six lines. Next, the third insulating layer 24c is stacked on the second insulating layer 24b in the manner of covering the second coil layer 25b, thereby completing the insulating substance layer 24 including three stages of the insulating layers 24a, 24b and 24c in order to insulate a coil conductive layer 25 having two stages and six lines.

Figure 9E:
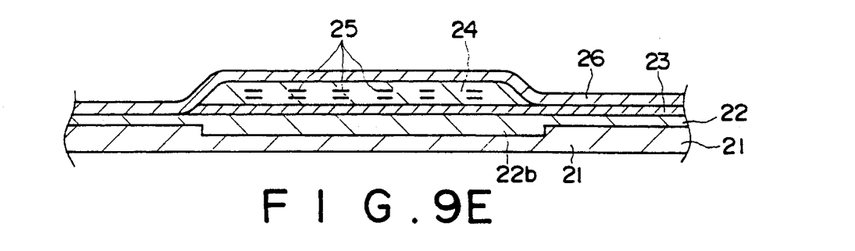

Furthermore, in a fifth step shown in FIG. 9E, the upper magnetic substance layer 26 of materials of amorphous or the like is stacked with a predetermined thickness in the manner of covering further and entirely the insulating substance layer 24, the gap layer 23, the lower magnetic substance layer 22 and the substrate 21, which are exposed.

Figure 9F:
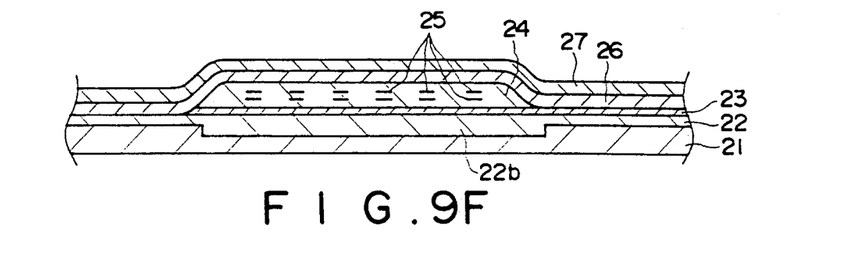
Figure 10:
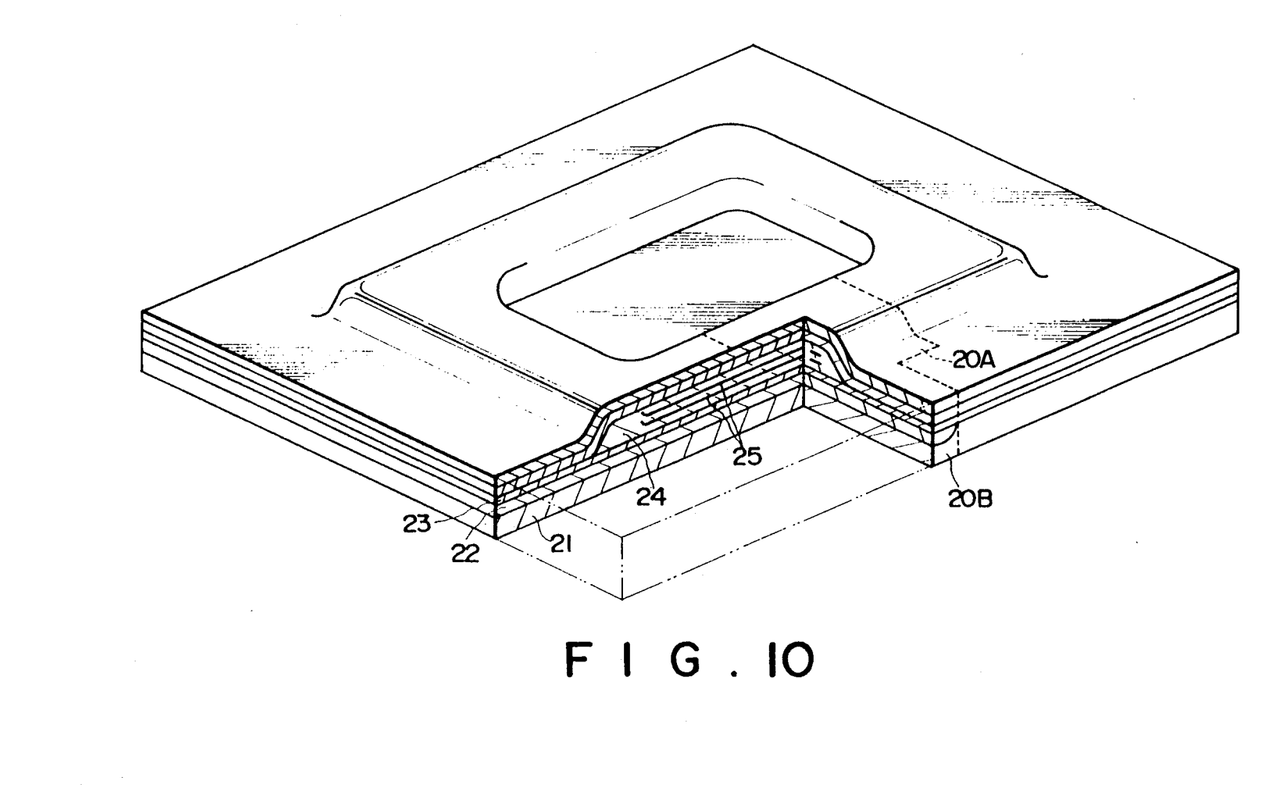
FIG. 10 is a perspective view with a partial cut showing a head material which is formed by stacking each layers in a predetermined shape through predetermined steps.

At last, in a sixth step shown in FIG. 9F, the protective layer 27 of materials of plastic or glass having low-temperature melting point, is stacked in the manner of covering an upper surface of the upper magnetic substance layer 26, thereby completing the material 20 of the thin-film magnetic head 20A.

The material 20 formed through the above steps is cut in a predetermined shape shown in FIG. 5 as a tail-end step, thereby completing the thin-film magnetic head as a product by polishing the tape contacting surface.

Though the above description is performed in that the material 20 of the thin-film magnetic head 20A has three stages of the insulating substance layer 24 and two stages of coil conductive layer 25 which are formed between the each stages of the insulating substance layer 24 in order to insulate the coil layer 25, a formation of each layers uses the thin-film formation technique such as sputtering and a vacuum evaporation and the thin-film treatment technique such as ion-milling and dry etching which is the same as the conventional method.

In the thin-film magnetic head according to the above embodiment of the present invention, since the first and second grooves 21a and 21b for filling the lower magnetic layer 22 is treated by using a dicing-saw or laser and various etching method, it is possible to easily change the depth of the grooves for processing. Accordingly, it is possible to regulate the thickness of the magnetic substance layers 22a and 22b to be required, thereby preventing the magnetic circuit from a magnetic saturation and eliminating processing steps such as patterning in order to form a track width t.

What is claimed is:

1. A thin-film magnetic head comprising a non-magnetic insulating substrate, a lower magnetic substance layer on said non-magnetic insulating substrate, a gap layer on said lower magnetic substance layer, an insulating substance layer on a predetermined area on said gap layer and which has a plurality of lines of coil layers therein, an upper magnetic substance layer which covers entirely said lower magnetic substance layer, said gap layer and said insulating substance layer, and a protective layer on said upper magnetic substance layer;

said non-magnetic insulating substrate having a first groove which is shallowly formed therein at a right angle to a surface which is to define the tape contacting surface, and a deeper second groove which is formed therein at a right angle to said first groove and parallel to said plurality of lines of coil layers to thereby underly and extend beyond said first groove; and wherein said lower magnetic substance layer forming a lower pole piece which includes a first magnetic substance layer portion which is disposed in and occupies said first groove of said insulating substrate and having a lateral width substantially equal to a track width of a magnetic tape to be used in recording and playback, and a second magnetic substance layer portion which is disposed in and occupies said second groove of said insulating substrate.

* * * * *